(12) United States Patent
Miyazawa et al.

(10) Patent No.: US 10,386,959 B2
(45) Date of Patent: *Aug. 20, 2019

(54) INFORMATION PROCESSING DEVICE, OPERATION INPUT METHOD AND OPERATION INPUT PROGRAM

(71) Applicant: Sony Corporation, Tokyo (JP)

(72) Inventors: Yusuke Miyazawa, Tokyo (JP); Fuminori Homma, Tokyo (JP)

(73) Assignee: Sony Corporation (JP)

( * ) Notice: Subject to any disclaimer, the term of this patent is extended or adjusted under 35 U.S.C. 154(b) by 51 days.

This patent is subject to a terminal disclaimer.

(21) Appl. No.: 15/989,304

(22) Filed: May 25, 2018

(65) Prior Publication Data

US 2018/0275818 A1 Sep. 27, 2018

Related U.S. Application Data

(63) Continuation of application No. 15/806,631, filed on Nov. 8, 2017, now Pat. No. 10,013,110, which is a (Continued)

(30) Foreign Application Priority Data

Jan. 19, 2010 (JP) ................ P2010-009183

(51) Int. Cl.
*G06F 3/041* (2006.01)
*G06F 3/0488* (2013.01)
(Continued)

(52) U.S. Cl.
CPC ........ *G06F 3/0416* (2013.01); *G02F 1/13338* (2013.01); *G06F 3/041* (2013.01);
(Continued)

(58) Field of Classification Search
CPC ....... G02F 1/13338; G06F 2203/04101; G06F 2203/04104; G06F 2203/04108;
(Continued)

(56) References Cited

U.S. PATENT DOCUMENTS 7,786,980 B2 8/2010 Lashina
8,310,456 B2 11/2012 Kim et al.
(Continued)

FOREIGN PATENT DOCUMENTS

| CN | 101097496 A | 1/2008 |
|---|---|---|
| CN | 101546245 A | 9/2009 |
| JP | 2006-302126 A | 11/2006 |

OTHER PUBLICATIONS

Office Action for Chinese Application No. 201110005283.5, dated Sep. 24, 2014.
(Continued)

*Primary Examiner* — Dmitriy Bolotin
(74) *Attorney, Agent, or Firm* — Lerner, David, Littenberg, Krumholz & Mentlik, LLP

(57) ABSTRACT

Disclosed herein is an information processing device including a contact detection unit configured to detect a contact operation for an operation surface, an approach detection unit configured to detect an approach operation for the operation surface, and a control unit configured to recognize the contact operation and the approach operation as a series of operation inputs when the contact operation and the approach operation are continuously detected.

20 Claims, 15 Drawing Sheets

Related U.S. Application Data continuation of application No. 15/332,213, filed on Oct. 24, 2016, now Pat. No. 9,841,838, which is a continuation of application No. 14/033,997, filed on Sep. 23, 2013, now Pat. No. 9,507,469, which is a continuation of application No. 12/930,590, filed on Jan. 11, 2011, now Pat. No. 8,581,864.

(51) Int. Cl.
*G06F 3/044* (2006.01)
*G02F 1/1333* (2006.01)

(52) U.S. Cl.
CPC .......... *G06F 3/044* (2013.01); *G06F 3/04883* (2013.01); *G06F 2203/04101* (2013.01); *G06F 2203/04104* (2013.01); *G06F 2203/04108* (2013.01)

(58) Field of Classification Search
CPC ........ G06F 3/041; G06F 3/0416; G06F 3/044; G06F 3/04883
See application file for complete search history.

(56) References Cited

U.S. PATENT DOCUMENTS

| | | | |
|---|---|---|---|
| 10,013,110 B2* | 7/2018 | Miyazawa | G06F 3/0416 |
| 2002/0030667 A1 | 3/2002 | Hinckley et al. | |
| 2003/0043174 A1 | 3/2003 | Hinckley et al. | |
| 2003/0189211 A1 | 10/2003 | Dietz | |
| 2004/0150630 A1 | 8/2004 | Hinckley et al. | |
| 2006/0267953 A1 | 11/2006 | Peterson et al. | |
| 2007/0262951 A1 | 11/2007 | Huie et al. | |
| 2007/0283263 A1 | 12/2007 | Zawde et al. | |
| 2008/0012835 A1 | 1/2008 | Rimon et al. | |
| 2008/0018604 A1 | 1/2008 | Paun et al. | |
| 2008/0278450 A1 | 11/2008 | Lashina | |
| 2009/0058829 A1 | 3/2009 | Kim et al. | |
| 2009/0174684 A1 | 7/2009 | Ryu et al. | |
| 2009/0237371 A1 | 9/2009 | Kim et al. | |
| 2009/0237372 A1 | 9/2009 | Kim et al. | |
| 2009/0237421 A1 | 9/2009 | Kim et al. | |
| 2009/0244019 A1 | 10/2009 | Choi | |
| 2009/0295715 A1 | 12/2009 | Seo et al. | |
| 2009/0312101 A1 | 12/2009 | Pope | |
| 2010/0020035 A1 | 1/2010 | Ryu et al. | |
| 2010/0026723 A1 | 2/2010 | Nishihara et al. | |
| 2010/0107099 A1 | 4/2010 | Frazier et al. | |
| 2010/0117970 A1 | 5/2010 | Burstrom et al. | |
| 2010/0169772 A1 | 7/2010 | Stallings et al. | |
| 2010/0251112 A1 | 9/2010 | Hinckley et al. | |
| 2010/0295802 A1 | 11/2010 | Lee | |
| 2010/0321275 A1 | 12/2010 | Hinckley et al. | |
| 2011/0018811 A1 | 1/2011 | Miernik | |
| 2011/0022393 A1 | 1/2011 | Waller et al. | |
| 2011/0164029 A1 | 7/2011 | King et al. | |
| 2012/0054670 A1 | 3/2012 | Rainisto | |

OTHER PUBLICATIONS

Chinese Office Action for Chinese Application No. 201110005283.5, dated May 26, 2015.

Office Action for Application No. 201110005283.5, dated Sep. 21, 2014.

* cited by examiner

INFORMATION PROCESSING DEVICE, OPERATION INPUT METHOD AND OPERATION INPUT PROGRAM

CROSS-REFERENCE TO RELATED APPLICATION

The present application is a continuation of U.S. patent application Ser. No. 15/806,631, filed Nov. 8, 2017 which is a continuation of U.S. application Ser. No. 15/332,213, filed Oct. 24, 2016, issued as U.S. Pat. No. 9,841,838 on Dec. 12, 2017 which is a continuation of U.S. application Ser. No. 14/033,997, filed Sep. 23, 2013, issued as U.S. Pat. No. 9,507,469 on Nov. 29, 2016 which is a continuation of U.S. application Ser. No. 12/930,590, filed Jan. 11, 2011, issued as U.S. Pat. No. 8,581,864 on Nov. 12, 2013 which claims priority from Japanese Patent Application No. JP 2010-009183 filed in the Japanese Patent Office on Jan. 19, 2010, the entire contents of which are incorporated herein by reference.

BACKGROUND OF THE INVENTION

1. Field of the Invention

The present invention relates to an information processing device, an operation input method and an operation input program and is suitably applicable to, for example, an information processing device having a touch panel.

2. Description of the Related Art

In recent years, an information processing device having a touch panel has come into wide use. In an information processing device having a touch panel, contact of an indicator (finger, touch pen, or the like) with the touch panel is detected and received as an operation input so as to execute various processes.

Recently, an information processing device capable of detecting approach in addition to contact of an indicator with a touch panel has been proposed (for example, Japanese Unexamined Patent Application Publication No. 2006-302126). In this information processing device, even when a finger which is in contact with the touch panel is separated from the touch panel, if the finger is close to the touch panel, a process performed when the finger is in contact with the touch panel is continuously performed.

For example, when a button displayed on a screen is long pressed, although the finger is separated from the touch panel partway by vibration or the like, the same process when the button is long pressed, that is, the process intended by a user may be executed.

SUMMARY OF THE INVENTION

However, in the information processing device having the touch panel of the related art, fundamentally, an operation input is performed by bringing the indicator into contact with the touch panel.

If approach is selected as an object for the operation input in addition to the contact of the indicator with the touch panel, it is possible to perform various operation inputs compared with the related art.

It is desirable to provide an information processing device, an operation input method and an operation input program, which is capable of performing various operation inputs, compared with the related art.

According to an embodiment of the present invention, there is provided an information processing device including: a contact detection unit configured to detect a contact operation for an operation surface; an approach detection unit configured to detect an approach operation for the operation surface; and a control unit configured to recognize the contact operation and the approach operation as a series of operation inputs when the contact operation and the approach operation are continuously detected.

By recognizing the continuous contact operation and approach operation as the series of operation inputs, it is possible to increase the kinds of the operation inputs compared with the case of selecting only the contact operation as an object for an operation input.

According to the present invention, by recognizing the continuous contact operation and approach operation as the series of operation inputs, it is possible to increase the kinds of the operation inputs compared with the case of selecting only the contact operation as an object for an operation input. Therefore, it is possible to realize an information processing device, an operation input method and an operation input program, which is capable of performing various operation inputs compared with the related art.

DESCRIPTION OF THE PREFERRED EMBODIMENTS

Hereinafter, a best mode (hereinafter, referred to as an embodiment) of the invention will be described. The description will be given in the following order.
1. Embodiment
2. Other Embodiments

1. Embodiment

1-1. Overview of Embodiment

First, the overview of an embodiment will be described. After the overview of the embodiment is described, detailed examples of the present invention will be given.

Figure 1:
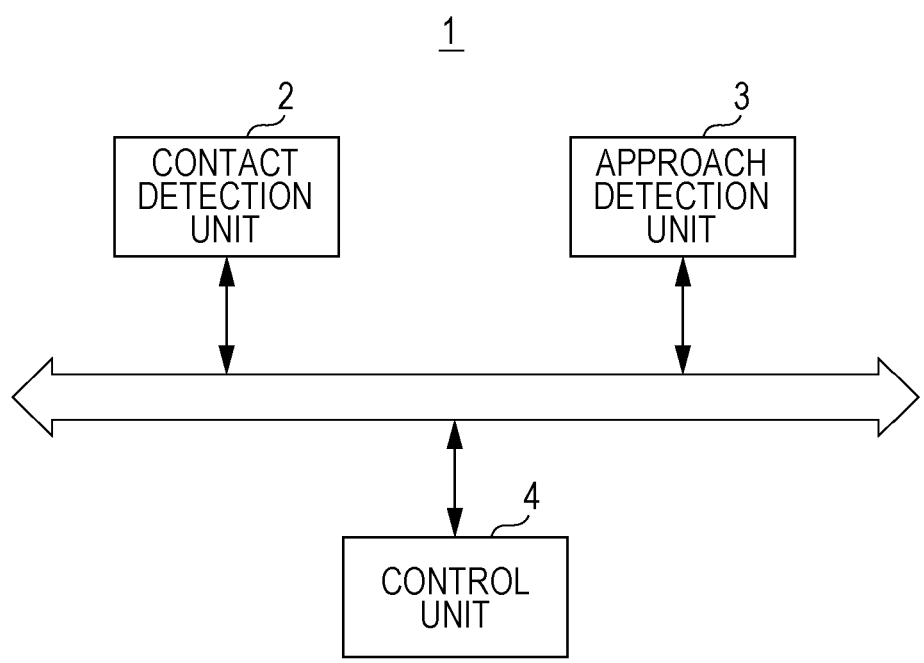
FIG. 1 is a block diagram showing the functional configuration of an information processing device according to the present embodiment.

In FIG. 1, a reference numeral 1 denotes an information processing device. In this information processing device 1, a contact detection unit 2 for detecting a contact operation with respect to an operation surface (for example, an operation surface of a touch panel) and an approach detection unit 3 for detecting an approach operation with respect to the operation surface are provided. In the information processing device 1, a control unit 4 for recognizing the contact operation and the approach operation as a series of operation inputs when the contact operation and the approach operation are continuously detected is provided.

The information processing device 1 recognizes the continuous contact operation and approach operation as the series of operation inputs so as to increase the kinds of the operation inputs compared with the case of selecting only the contact operation as an object for an operation input.

In more detail, the control unit 4 recognizes the contact operation and the approach operation as the series of operation inputs when the contact operation and the approach operation are continuously detected within a predetermined time. When the contact operation and the approach operation are continuously detected after exceeding the predetermined time, the contact operation and the approach operation are recognized as individual operation inputs.

At this time, the control unit 4 controls the execution of a predetermined process based on a predetermined contact operation detected by the contact detection unit 2 and controls a restoration process to a state before the execution of the predetermined process when the approach detection unit detects a predetermined approach operation within a predetermined time from the detection of the predetermined contact operation.

The control unit 4 may control the execution of a predetermined process based on a predetermined contact operation detected by the contact detection unit 2 and continue to execute the predetermined process when the approach detection unit 3 detects another approach operation within a predetermined time from the detection of the predetermined contact operation. At this time, another approach operation is, for example, an operation for separating an indicator from an operation surface and stopping the indicator after the contact operation.

The control unit 4 may control the execution of a predetermined process based on predetermined motion of a contact operation detected by the contact detection unit 2 and execute the predetermined process using a parameter different from a parameter used upon the execution based on the contact operation when the contact detection unit 3 detects the predetermined motion of the approach operation within a predetermined time from the detection of the contact operation.

The control unit 4 may execute control based on a certain direction and a contact operation, when the contact detection unit 2 detects a contact operation within a predetermined time after the approach detection unit 3 detects an approach operation for moving an indicator in a certain direction.

The control unit 4 may recognize a contact operation and an approach operation as a series of operation inputs, when the approach detection unit 3 detects an approach operation within a predetermined range from a contact position within a predetermined time after the contact detection unit 2 detects a contact operation.

Detailed examples of the information processing device 1 having the above configuration will now be described in detail.

Figure 2:
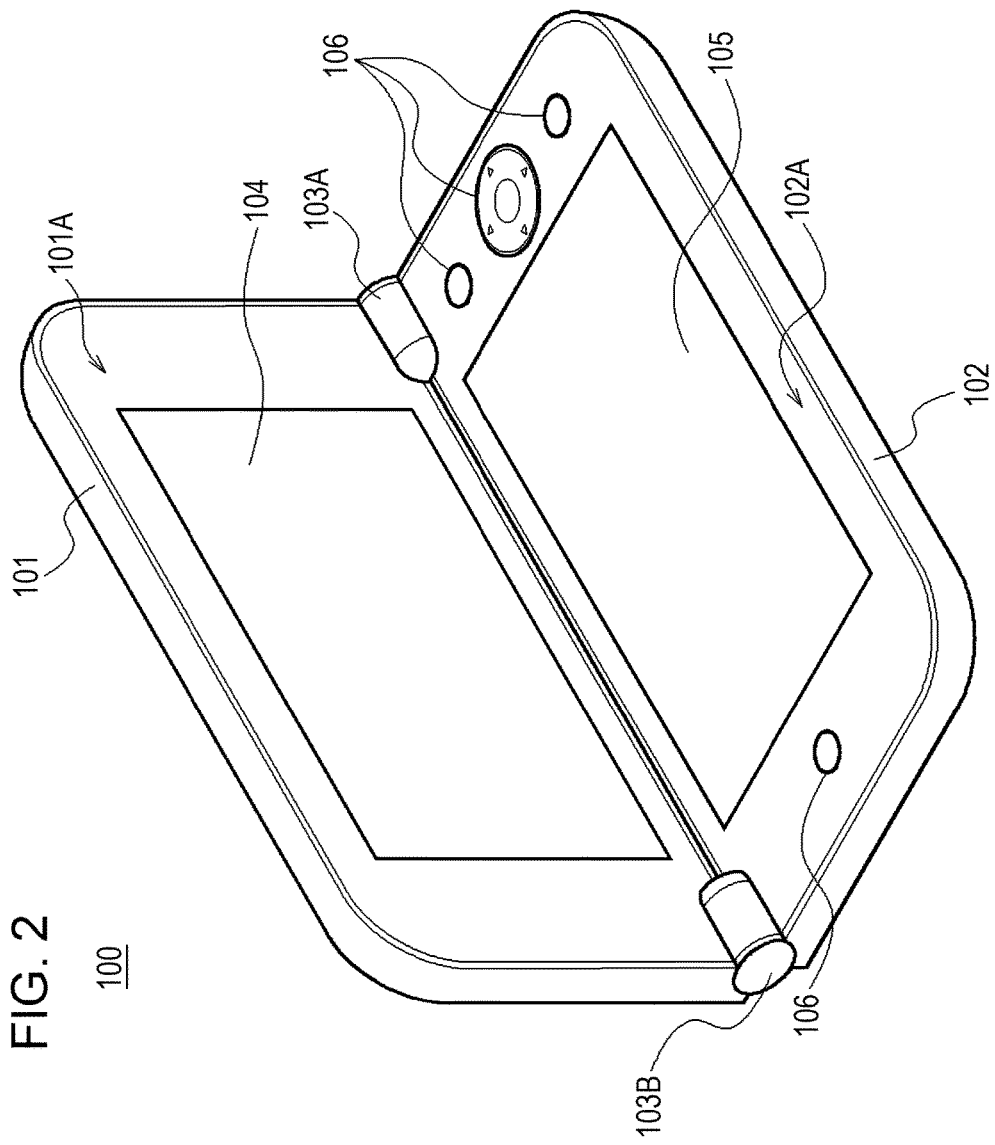
FIG. 2 is a schematic diagrammatic view showing the appearance configuration of a mobile terminal of a detailed example of the present invention.

1-2. Detailed Example of Embodiment 1-2-1. Appearance Configuration of Mobile Terminal Next, the appearance configuration of a mobile terminal 100 which is a detailed example of the above-described information processing device 1 will be described using FIG. 2.

The mobile terminal 100 is formed to be grasped by one hand, by openably and closably connecting substantially flat rectangular first and second casings 101 and 102 through hinge portions 103A and 103B.

A first rectangular touch screen 104 is provided in a central portion of a front surface 101A of the first casing 101. In addition, a second touch screen 105 having the same shape and size as the first touch screen 104 is provided in a central portion of a front surface 102A of the second casing 102.

Each of the first touch screen 104 and the second touch screen 105 includes a liquid crystal panel and a thin transparent touch panel covering a display surface of the liquid crystal panel. This touch panel is of a capacitance type and corresponds to a multitouch panel.

The mobile terminal 100 recognizes a contact operation and an approach operation of a finger (a touch pen or the like) on each of the first touch screen 104 and the second touch screen 105 as operation inputs. In addition, the contact operation is an operation (also referred to as a touch operation) performed by touching a touch screen with a finger and the approach operation is an operation performed by enabling a finger to approach a touch screen without touching the touch screen.

The mobile terminal 100 is used in a state in which the first casing 101 is located at an upper side and the second casing 102 is located at a lower side. In general, a variety of information is displayed in a state in which the first touch screen 104 is an upper screen and the second touch screen 105 is a lower screen.

A variety of operation keys 106 such as a power button is provided on the front surface 102A of the second casing 102 of the mobile terminal 100 at both sides of the second touch screen 105.

1-2-2. Hardware Configuration of Mobile Terminal

Figure 3:
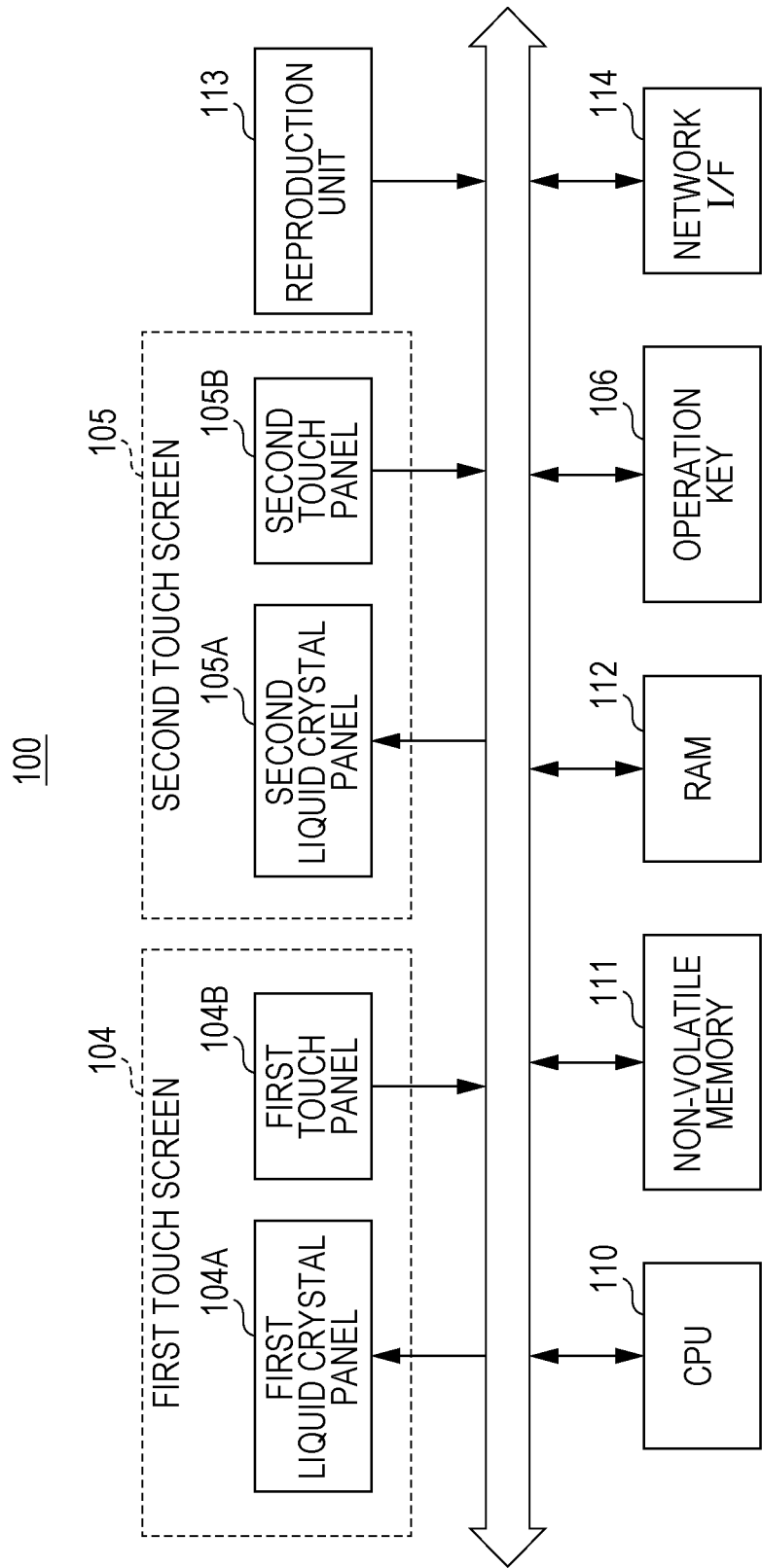
FIG. 3 is a block diagram showing the hardware configuration of a mobile terminal.

Next, the hardware configuration of the mobile terminal 100 will be described using FIG. 3. In the mobile terminal 100, a CPU 110 develops a program stored in a non-volatile memory 111 in a RAM 112, reads the program, executes a variety of processes according to the program, and controls each unit. In addition, the CPU is an abbreviation for a Central Processing Unit and the RAM is an abbreviation for a Random Access Memory.

When a touch operation or an approach operation for the first touch screen 104 and the second touch screen 105 is recognized, the CPU 110 receives the operation as an operation input and executes a process according to the operation input.

The first touch screen 104 includes a first liquid crystal panel 104A and a first touch panel 104B and the second touch screen 105 includes a second liquid crystal panel 105A and a second touch panel 105B.

The first liquid crystal panel 104A and the second liquid crystal panel 105A display a variety of information as the upper screen and the lower screen, respectively.

Each of the first touch panel 104B and the second touch panel 105B is a capacitance touch panel, as described above.

The first touch panel 104B has a plurality of electrostatic sensors (not shown) arranged in a lattice shape on an operation surface. An output value of each of the plurality of electrostatic sensors is changed according to capacitance changed as a conductor such as a finger comes close to the operation surface.

Figure 4:
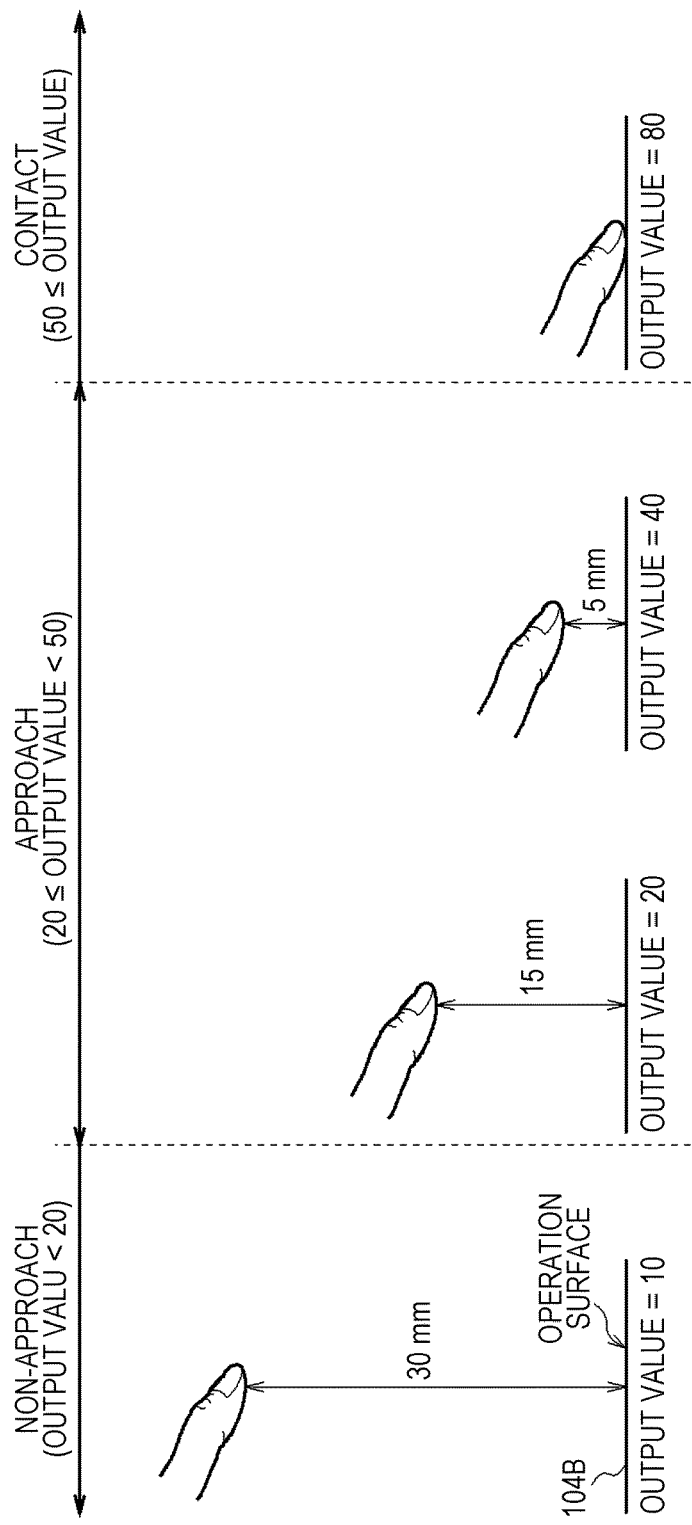
FIG. 4 is a schematic diagrammatic view showing a change of an output value of an electrostatic sensor.

In practice, as shown in FIG. 4, it is assumed that a finger approaches the operation surface of the first touch panel 104B. At this time, the output value of the electrostatic sensor located just under the finger is, for example, changed to "10" when a distance between the operation surface and the finger is 30 mm, "20" when the distance is 15 mm, "40" when the distance is 5 mm, and "80 as a maximum when the finger makes contact with the operation surface.

The CPU 110 acquires the changed output value of each electrostatic sensor and the position of each electrostatic sensor from the first touch panel 104B. The CPU 110 discriminates among a portion with which the finger contacts, a portion to which the finger approaches, and a portion with which the finger does not contact or to which the finger does not approach, on the operation surface of the first touch panel 104B based on the output value of each electrostatic sensor and the position of each electrostatic sensor. In addition, the portion with which the finger contacts is referred to as a contact portion, the portion to which the finger approaches is referred to as an approach portion, and the portion with which the finger does not contact or to which the finger does not approach is referred to as a non-approach portion.

Figure 5:
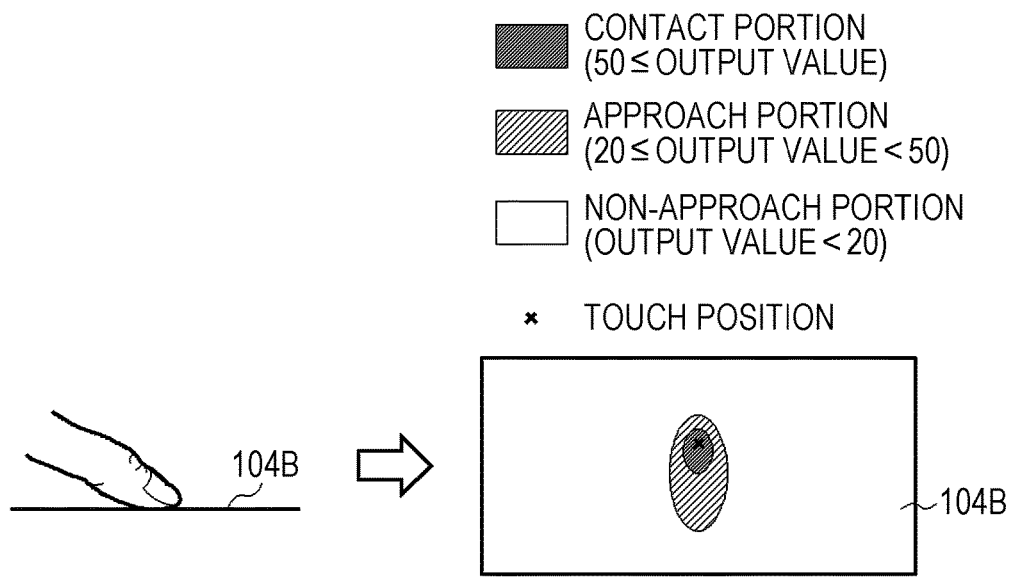
FIG. 5 is a schematic diagrammatic view serving to describe a determination of a contact portion, an approach portion and a non-approach portion.

In detail, as shown in FIG. 5, the CPU 110 discriminates a portion, in which the output value of the electrostatic sensor is equal to or greater than "50", on the operation surface of the first touch panel 104B as the contact portion. In addition, the CPU 110 discriminates a portion in which the output value is equal to or greater than "20" and is less than "50" as the approach portion and discriminates a portion in which the output value is less than "20" as the non-approach portion.

The CPU 110 discriminates the contact portion, the approach portion and the non-approach portion on the operation surface of the first touch panel 104B so as to specify whether the finger contacts the operation surface or approaches the operation surface. In addition, it is possible to specify where the finger contacts or approaches the operation surface. At this time, if a contact portion is present, the CPU 110 recognizes, for example, a centroid or a center (a centroid or a center of a ball of a finger which contacts the operation surface) of the contact portion as a touch position. If only an approach portion is present, the CPU 110 recognizes, for example, a centroid or a center (a centroid or a center of a ball of a finger which approaches the operation surface) as an approach position.

In addition, the CPU 110 acquires the output value of each electrostatic sensor from the first touch panel 104B every fixed time period and discriminates among the contact portion, the approach portion and the non-approach portion so as to detect the transition of the touch position and the approach position based on the contact portion, the approach portion and the non-approach portion. The CPU 110 specifies the motion of the finger on the first touch panel 104B based on the transition.

The CPU 110 recognizes and receives the touch operation and the approach operation for the first touch screen 104 as the operation inputs based on the specified motion of the finger on the first touch panel 104B.

The second touch panel 105B has a plurality of electrostatic sensors (not shown) arranged in a lattice shape on an operation surface, similar to the first touch panel 104B.

The CPU 110 acquires the output value of each electrostatic sensor from the second touch panel 105B every fixed time, discriminates among a contact portion, an approach portion and a non-approach portion on the operation surface of the second touch panel 105B, and detects the transition of a touch position and an approach position.

The CPU 110 specifies the motion of the finger on the second touch panel 105B based on the transition and recognizes and receives the touch operation and the approach operation for the second touch screen 105 as the operation inputs based on the motion of the finger.

The CPU 110 recognizes and receives the touch operation and the approach operation for the first touch screen 104 and the second touch screen 105 as the operation inputs, and executes processes according to the operation inputs.

The CPU 110 recognizes and receives a pressing operation of an operation key 106 as an operation input and executes a process according to this operation input.

For example, it is assumed that, in a state in which a playback button for playing back music data is displayed on the second touch screen 105, a user taps the playback button.

If such a touch operation is detected, the CPU 110 recognizes and receives the touch operation as an operation input for playing back the music data, reads the music data from the non-volatile memory 111, and sends the music data to a playback unit 113.

The playback unit 113 performs a playback process such as a decoding process, a digital-to-analog conversion process and an amplification process with respect to the music data under the control of the CPU 110, obtains a sound signal, and outputs the sound signal to a headphone terminal (not shown).

Thus, the user may listen to music using headphones connected to the headphone terminal.

At this time, the CPU 110 acquires information such as a song title or an artist name from the read music data and displays the information, for example, on the first liquid crystal panel 104A of the first touch screen 104A. Thus, it is possible to present the information about the music which is being played back to the user.

For example, it is assumed that, in a state in which a browser icon for starting up a web browser is displayed on the second touch screen 104, a user taps the browser icon.

If such a touch operation is detected, the CPU 110 recognizes and receives the touch operation as an operation input for starting up the web browser and starts up the web browser.

The CPU 110 displays a web browser screen on the first liquid crystal panel 104A and the second liquid crystal panel 105A and receives page data of a web page from a server on a network through a network interface 114. The CPU 110 displays a page image based on the page data on the web browser screen.

Thus, the user may browse the web page through the web browser screen.

The detailed hardware examples of the contact detection unit 2 and the approach detection unit 3 of the information processing device 1 described as the overview of the present embodiment are the first touch panel 104B and the second touch panel 105B of the above-described mobile terminal 100. The detailed hardware example of the control unit 4 of the information processing device 1 is the CPU 110 of the mobile terminal 100.

The mobile terminal 100 not only recognizes and receives the touch operation and the approach operation as individual operation inputs, but also recognizes and receives such operations as a series of operation inputs when such operations are continuously performed within a predetermined time.

Hereinafter, the operation inputs when the touch operation and the approach operation are continuously performed will be described in detail.

Figure 6:
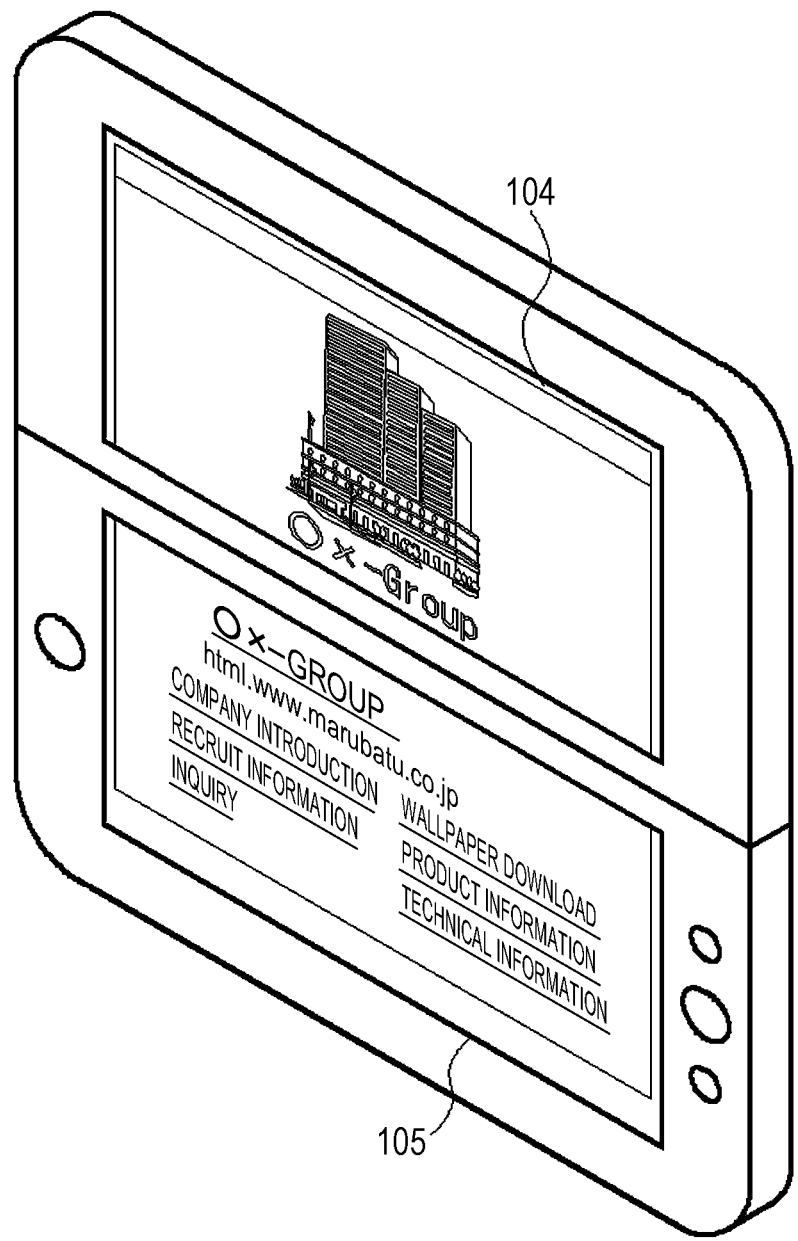
FIG. 6 is a schematic diagrammatic view serving to describe the display of a web browser screen.

1-3. Operation Input When Touch Operation and Approach Operation are Continuously Performed As shown in FIG. 6, it is assumed that an upper half of the web browser screen is displayed on the first touch screen 104 and a lower half of the web browser screen is displayed on the second touch screen 105.

At this time, as the contact operations and the approach operations there are pinch-in, pinch-out, shuffle and the like which are recognized and received by the CPU 110 as the operation inputs.

Figure 7:
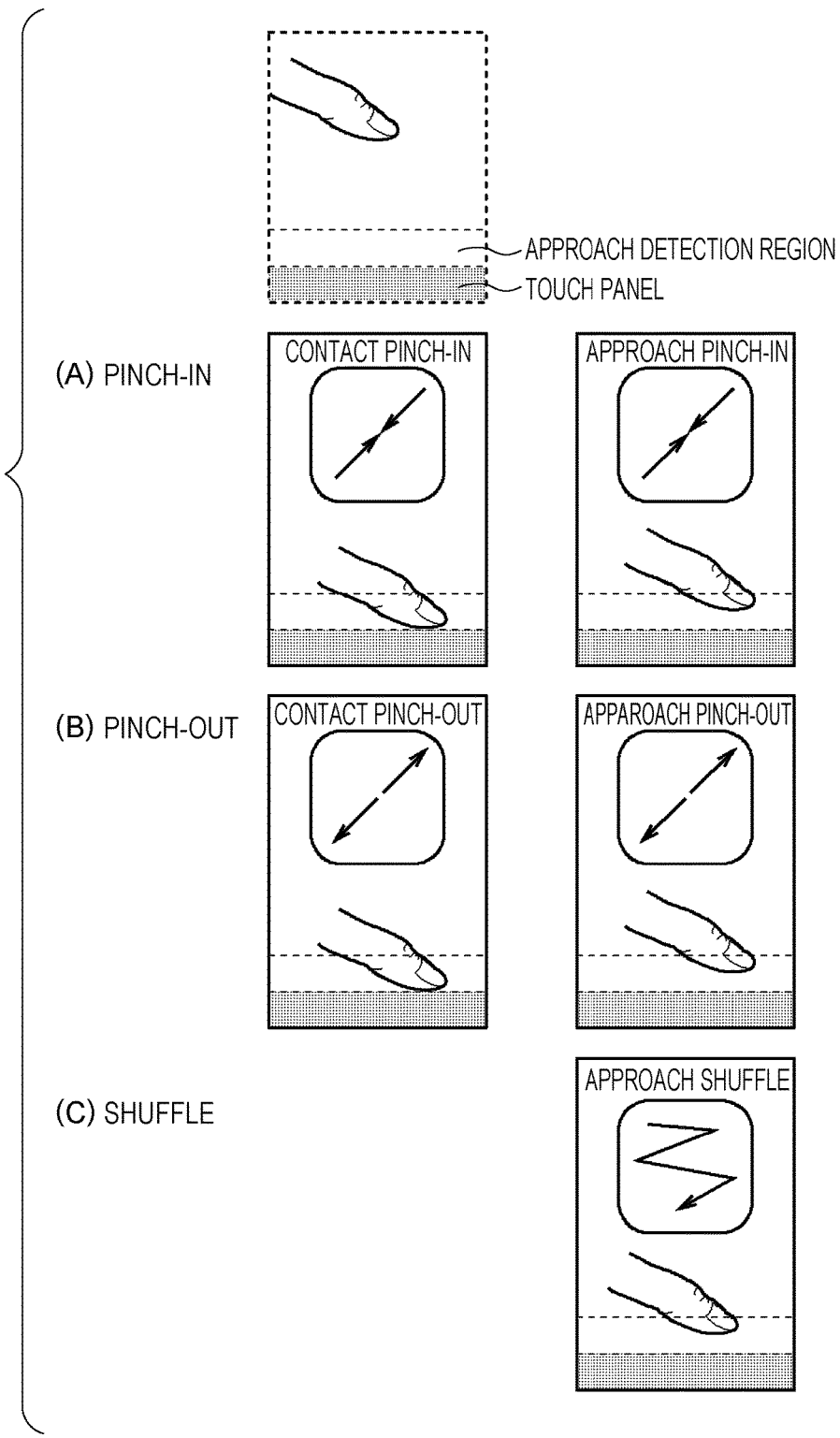
FIG. 7 is a schematic diagrammatic view showing an example of a touch operation and an approach operation.

Pinch-in refers to an operation for narrowing a space between two fingers (for example, a thumb and a forefinger). As shown in (A) of FIG. 7, pinch-in includes contact pinch-in as a touch operation performed by enabling two fingers to touch a touch panel and approach pinch-in as an approach operation performed by enabling two fingers to approach a touch panel.

Pinch-out refers to an operation for widening a space between two fingers. As shown in (B) of FIG. 7, pinch-out includes contact pinch-out as a touch operation performed by enabling two fingers to touch a touch panel and approach pinch-out as an approach operation performed by enabling two fingers to approach a touch panel.

Shuffle refers to an operation for drawing a zigzag with one finger. As shown in (C) of FIG. 7, shuffle includes only approach shuffle as an approach operation performed by enabling one finger to approach a touch panel. In addition, in order to maintain compatibility with a general operation of the related art which performs only a touch operation as an operation input, when one finger touches a touch panel so as to perform shuffle, the CPU 110 does not recognize contact shuffle, but recognizes general drag.

As an example of continuously performing the touch operation and the approach operation, for example, approach shuffle may be performed after contact pinch-in.

Figure 8:
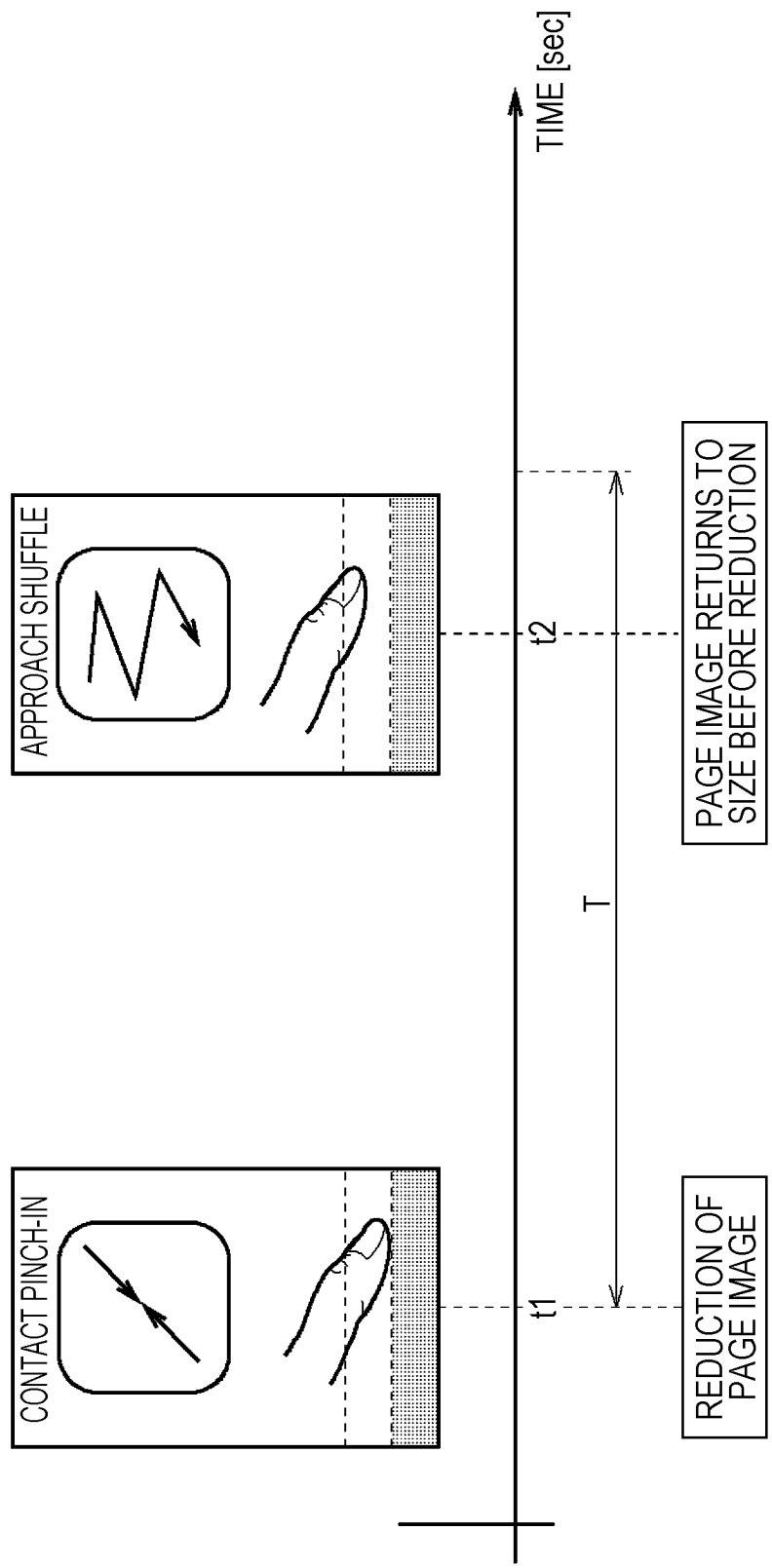
FIG. 8 is a schematic diagrammatic view serving to describe an example (1) of performing an approach operation within a predetermined time T after a touch operation.

In practice, as shown in FIG. 8, it is assumed that, at a certain time t1, contact pinch-in is performed as a touch operation with respect to the first touch screen 104.

When the contact pinch-in is detected, the CPU 110 recognizes and receives the contact pinch-in as an operation input for reducing a page image of a web browser screen, reduces the page image, and displays the reduced page image on the web browser screen.

At this time, the CPU 110 sets a reduction ratio of the page image, for example, in a range of ½ to ⅓ of the movement amount of two fingers when the contact pinch-in is performed. The CPU 110 sets a value (½) obtained by multiplying a current display scaling factor (for example, one time) of the page image by the set reduction ratio (for example, ½) as a new display scaling factor (½) and reduces the page image.

Thereafter, it is assumed that, at a certain time t2, the user separates the fingers from the first touch screen 104 so as to perform approach shuffle as an approach operation.

When the approach shuffle is detected, the CPU 110 determines whether or not the current time t2 is within a predetermined time T (about 1 second) from the time t1 when the previous touch operation (contact pinch-in) is performed.

If the current time t2 when the approach shuffle is performed is within the predetermined time T from the time t1 when the previous touch operation is performed, the CPU 110 determines that the current approach operation (approach shuffle) is an operation associated with the previous touch operation.

At this time, the CPU 110 recognizes and receives the approach shuffle as an operation input for returning the display scaling factor of the page image to a value before reduction by the previous contact pinch-in and returns the display scaling factor of the page image to the value (that is, one time) before reduction.

Figure 9:
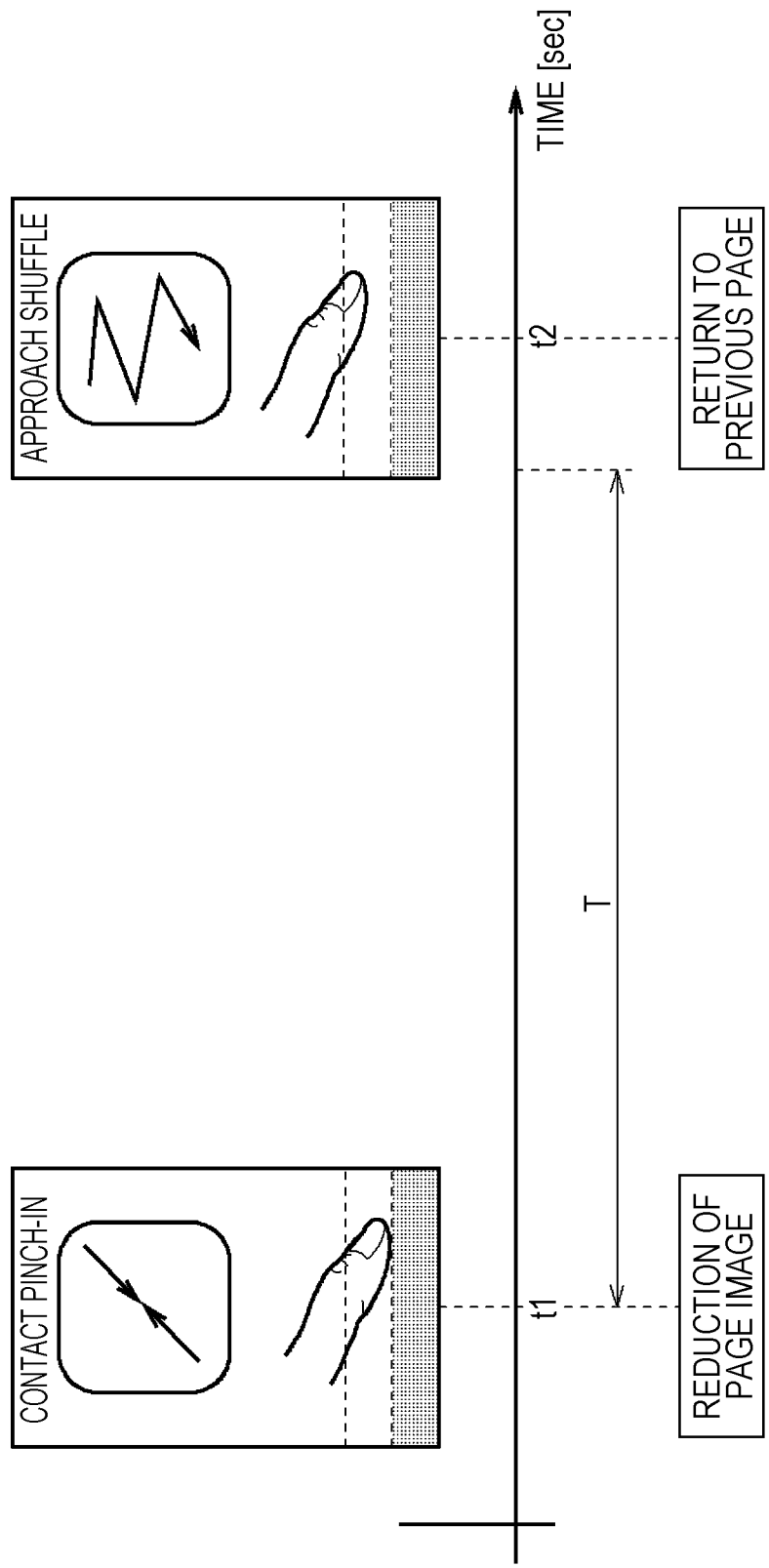
FIG. 9 is a schematic diagrammatic view serving to describe an example of performing an approach operation when exceeding a predetermined time T after a touch operation.

In contrast, as shown in FIG. 9, it is assumed that the current time t2 which the approach shuffle is performed exceeds the predetermined time T from the time t1 when the previous touch operation is performed. In this case, the CPU 110 determines that the current approach operation (approach shuffle) is independent of the previous touch operation.

At this time, the CPU 110 recognizes and receives the approach shuffle as an operation input returned to the previous page image and displays the previous page image on the web browser screen instead of the currently displayed page image.

When the approach shuffle is performed within the predetermined time T after the contact pinch-in, the CPU 110 recognizes and receives the approach shuffle as a series of operation inputs continued to the previous contact pinch-in.

When the approach shuffle is performed after the predetermined time T after the contact pinch-in, the approach shuffle is recognized and received as an operation input independent of the previous contact pinch-in.

As another example of continuously performing the touch operation and the approach operation, for example, approach shuffle may be performed after contact pinch-out.

In practice, it is assumed that, at a certain time t1, contact pinch-out is performed as a touch operation with respect to the first touch screen 104 (not shown) by the user.

When the contact pinch-out is detected, the CPU 110 recognizes and receives the contact pinch-out as an operation input for enlarging a page image of a web browser screen, enlarges the page image, and displays the enlarged page image on the web browser screen.

At this time, the CPU 110 sets an enlargement ratio, for example, in a range of two times to three times the movement amount of two fingers when the contact pinch-out is performed. The CPU 110 sets a value (two times) obtained by multiplying a current display scaling factor (for example, one time) of the page image by the set enlargement ratio (for example, two times) as a new display scaling factor (two times) and enlarges the page image.

Thereafter, it is assumed that, at a certain time t2, the user separates the fingers from the first touch screen 104 so as to perform approach shuffle as an approach operation.

When the approach shuffle is detected, the CPU 110 determines whether or not the current time t2 is within a predetermined time T (about 1 second) from the time t1 when the previous touch operation (contact pinch-out) is performed.

If the current time t2 when the approach shuffle is performed is within the predetermined time T from the time t1 when the previous touch operation is performed, the CPU 110 determines that the current approach operation (approach shuffle) is an operation associated with the previous touch operation.

At this time, the CPU 110 recognizes and receives the approach shuffle as an operation input for returning the display scaling factor of the page image to a value before enlargement by the previous contact pinch-out and returns the display scaling factor of the page image to the value (that is, one time) before enlargement.

In contrast, if the current time t2 which the approach shuffle is performed exceeds the predetermined time T from the time t1 when the previous touch operation is performed, the CPU 110 determines that the current approach operation (approach shuffle) is independent of the previous touch operation.

At this time, the CPU 110 recognizes and receives the approach shuffle as an operation input returned to the previous page image and displays the previous page image on the web browser screen instead of the currently displayed page image.

When the approach shuffle is performed within the predetermined time T after the contact pinch-out, the CPU 110 recognizes and receives the approach shuffle as a series of operation inputs continued to the previous contact pinch-out.

When the approach shuffle is performed after the predetermined time T after the contact pinch-out, the approach shuffle is recognized and received as an operation input independent of the previous contact pinch-out.

As another example of continuously performing the touch operation and the approach operation, for example, approach pinch-out may be performed after contact pinch-out.

Figure 10:
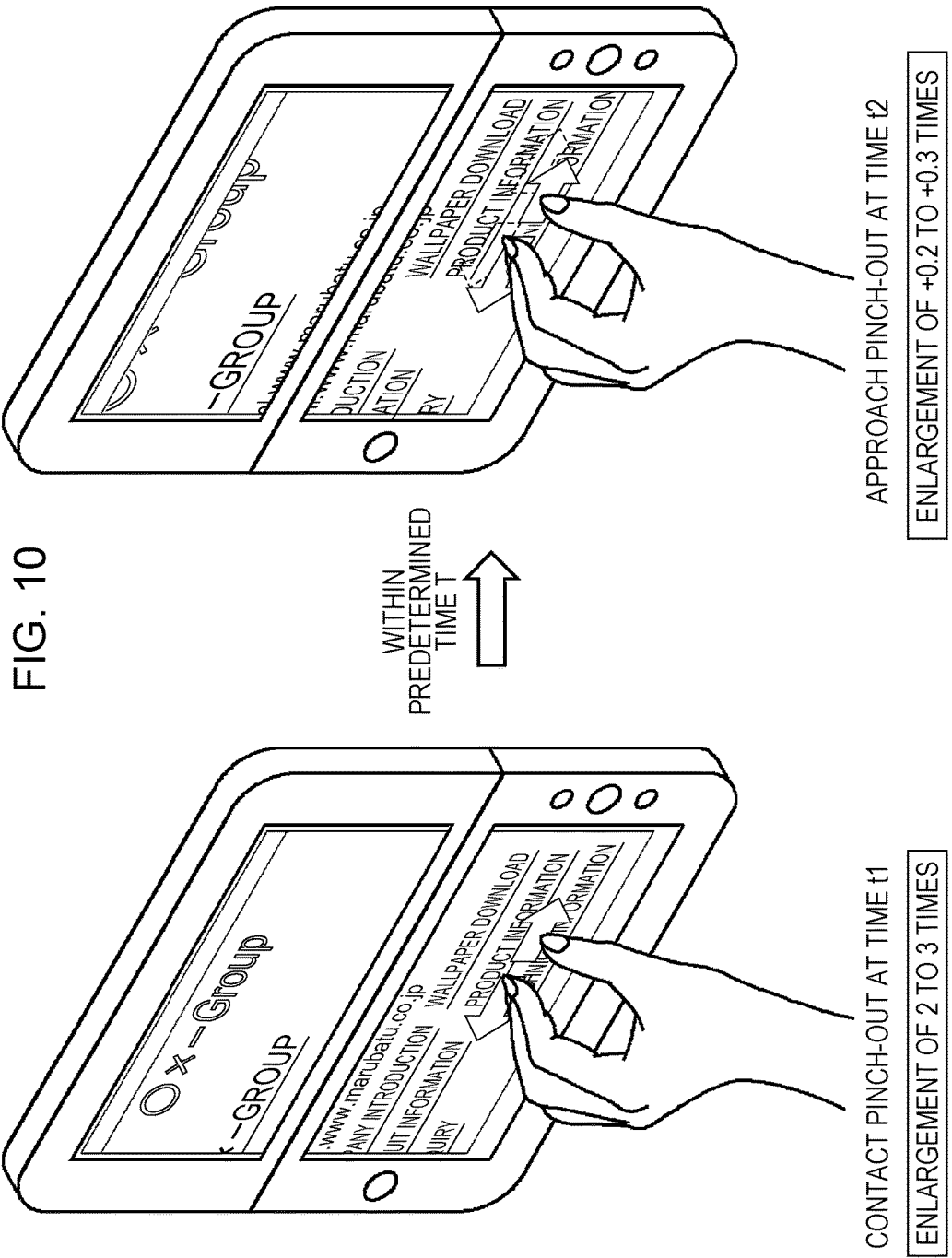
FIG. 10 is a schematic diagrammatic view serving to describe an example (2) of performing an approach operation within a predetermined time T after a touch operation.

In practice, as shown in FIG. 10, it is assumed that, at a certain time t1, contact pinch-out is performed as a touch operation with respect to the first touch screen 104 by the user.

When the contact pinch-out is detected, the CPU 110 recognizes and receives the contact pinch-out as an operation input for enlarging a page image of a web browser screen, enlarges the page image, and displays the enlarged page image on the web browser screen, as described above.

At this time, the CPU 110 sets an enlargement ratio, for example, in a range of two times to three times the movement amount of two fingers when the contact pinch-out is performed. The CPU 110 sets a value (two times) obtained by multiplying a current display scaling factor (for example, one time) of the page image by the set enlargement ratio (for example, two times) as a new display scaling factor (two times) and enlarges the page image.

Thereafter, it is assumed that, at a certain time t2, the user separates the fingers from the first touch screen 104 so as to perform approach pinch-out as an approach operation.

When the approach pinch-out is detected, the CPU 110 determines whether or not the current time t2 is within a predetermined time T from the time t1 when the previous touch operation (contact pinch-out) is performed.

If the current time t2 when the approach pinch-out is performed is within the predetermined time T from the time t1 when the previous touch operation is performed, the CPU 110 determines that the current approach operation (approach pinch-out) is an operation associated with the previous touch operation.

At this time, the CPU 110 recognizes and receives the approach pinch-out as an operation input for more finely setting the enlargement ratio of the page image enlarged by the previous contact pinch-out and more finely sets the enlargement ratio of the page image.

At this time, the CPU 110 more finely sets the enlargement ratio, for example, in a range of +0.2 times to +0.3 times of the movement amount of two fingers when the contact pinch-out is performed. The CPU 110 sets a value (2.3 times) obtained by adding the set enlargement ratio (for example, +0.3 times) to a current display scaling factor (for example, two times) of the page image as a new display scaling factor (2.3 times) and enlarges the page image.

In contrast, if the current time t2 which the approach pinch-out is performed exceeds the predetermined time T from the time t1 when the previous touch operation is performed, the CPU 110 determines that the current approach operation (approach pinch-out) is independent of the previous touch operation. At this time, the CPU 110 does not receive the approach pinch-out as an operation input.

When the approach pinch-out is performed within the predetermined time T after the contact pinch-out, the CPU 110 recognizes and receives the approach pinch-out as an operation input associated with the previous contact pinch-out.

As described up to now, the mobile terminal 100 recognizes and receives not only the touch operation but also the approach operation as the operation input with respect to the first touch panel 104B and the second touch panel 105B.

Accordingly, in the mobile terminal 100, it is possible to perform various operation inputs, compared with the case where only the touch operation is recognized and received as the operation input.

In the mobile terminal 100, the approach operation is recognized and received as the operation input in addition to the touch operation. In addition, when the touch operation and the approach operation are continuously performed within the predetermined time T, these operations are recognized and received as a series of operation inputs.

Therefore, in the mobile terminal 100, it is possible to recognize and receive the touch operation and the approach operation as individual operation inputs and to perform an operation input obtained by combining such operations. As a result, it is possible to perform various operation inputs.

As described above, in the mobile terminal 100, when a specific approach operation (for example, approach shuffle) is performed within the predetermined time T after the touch operation, a process of returning to a state before the process of the touch operation is executed, is executed.

For example, even when a button for returning to an original state, which is displayed on the screen, is not touched, it is possible to return a state just before the touch operation by one approach operation.

In the mobile terminal 100, after a touch operation for enlarging/reducing an image or the like, when the approach operation of the same motion as the touch operation is performed within the predetermined time T, the same process (enlargement/reduction) is executed by a change ratio different from that of the touch operation.

Therefore, for example, after the image is roughly enlarged/reduced by the touch operation, the size of the image may be finely adjusted by the approach operation.

1-4. Procedure of Receiving Operation Input

Figure 11:
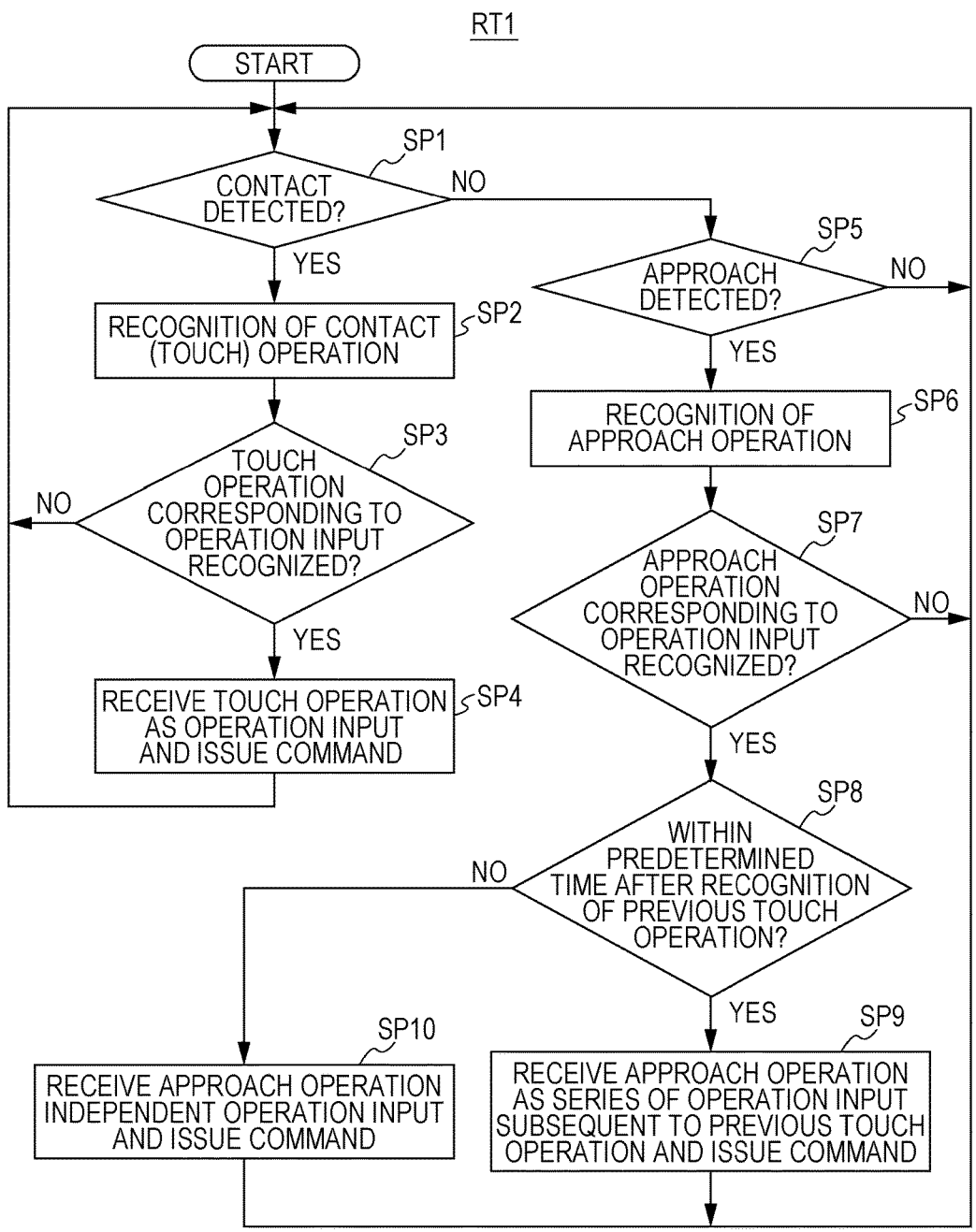
FIG. 11 is a flowchart illustrating a procedure of an operation input reception process.

Next, a detailed procedure (this is also referred to as an operation input reception process) of recognizing and receiving an operation input by the mobile terminal 100 will be described using the flowchart shown in FIG. 11. The operation input reception procedure RT1 shown in FIG. 11 is a procedure executed according to a program stored in the non-volatile memory 111 by the CPU 110 of the mobile terminal 100.

The CPU 110 starts the operation input reception procedure RT1, for example, when the mobile terminal 100 is powered on, and transitions to step SP1. In step SP1, the CPU 110 determines whether or not the contact of the finger with the first touch panel 104B or the second touch panel 105B is detected.

For example, if a positive result is obtained in step SP1 by the detection of the contact of the finger with the first touch panel 104B, the CPU 110 transitions to step SP2.

In step SP2, the CPU 110 detects a touch operation and transitions to next step SP3. In step SP3, the CPU 110 determines whether or not the touch operation (for example, the above-described contact pinch-in, contact pinch-out, or the like) corresponding to the operation input is detected in step SP2 of the previous stage.

If the touch operation corresponding to the operation input is detected in step SP2 of the previous stage and thus a positive result is obtained in step SP3, the CPU 110 sets a timer for measuring the above-described predetermined time T and transitions to step SP4.

In step SP4, the CPU 110 recognizes and receives the touch operation detected in step SP2 as an operation input and issues a command (for example, a command for reducing a page image) corresponding to the operation input. As a result, a process (for example, a process of reducing the page image) corresponding to the command is executed. The CPU 110 returns to step SP1 again. If a negative result is obtained in the above-described step SP3 (that is, if the touch operation detected in step SP2 is not the touch operation corresponding to the operation input), the CPU 110 returns to step SP1 again.

If the contact of the finger is not detected and thus a negative result is obtained in the above-described step SP1, the CPU 110 transitions to step SP5.

In step SP5, the CPU 110 determines whether or not the approach of the finger to the first touch panel 104B or the second touch panel 105B is detected.

If, for example, the approach of the finger to the first touch panel 104B is detected and a positive result is obtained in step SP5, the CPU 110 transitions to step SP6.

In step SP6, the CPU 110 detects an approach operation and transitions to next step SP7. In step SP7, the CPU 110 determines whether or not the approach operation (for example, the above-described approach pinch-out, approach shuffle, or the like) corresponding to the operation input is detected in step SP6 of the previous stage.

If the approach operation corresponding to the operation input is detected in step SP6 of the previous stage and thus a positive result is obtained in step SP7, the CPU 110 transitions to step SP8.

In step SP8, the CPU 110 determines whether or not the current time is within the predetermined time T from the time when the touch operation corresponding to the previous operation input is detected, based on the output of the timer.

If the current time is within the predetermined time T from the time when the touch operation corresponding to the previous operation input is detected and thus a positive result is obtained in step SP8, the CPU 110 transitions to step SP9.

In step SP9, the CPU 110 recognizes and receives the detected approach operation as the series of operation inputs continued to the previous touch operation and issues a command (for example, a command for returning the display scaling factor of the page image to a value before reduction) corresponding to the operation input. As a result, a process (for example, a process of returning the display scaling factor of the page image to the value before reduction) corresponding to the command is executed. Then, the CPU 110 resets the timer and returns to step SP1 again.

If the current time exceeds the predetermined time T from the time when the touch operation corresponding to the previous operation input is detected and thus a negative result is obtained in the above-described step SP8, the CPU 110 transitions to step SP10.

In step SP10, the CPU 110 recognizes and receives the detected approach operation as an independent operation input and issues a command (for example, a command for returning to a previous page) corresponding to the operation input. As a result, a process (for example, a process of returning to the previous page) corresponding to the command is executed. Then, the CPU 110 resets the timer and then returns to step SP1 again. If a negative result is obtained in the above-described step SP7 (that is, if the approach operation detected in step SP6 is not the approach operation corresponding to the operation input), the CPU 110 returns to step SP1 again.

The CPU 110 of the mobile terminal 100 receives the touch operation and the approach operation as the operation input by the operation input reception procedure RT1.

1-5. Operation and Effect

In the above configuration, the CPU 110 of the mobile terminal 100 monitors the output values of the capacitance type first touch panel 104B and second touch panel 105B so as to recognize the touch operation and the approach operation thereof.

If the touch operation for the first touch panel 104B or the second touch panel 105B is detected, the CPU 110 recognizes and receives the touch operation as the operation input and executes the process corresponding to the operation input.

If the approach operation for the first touch panel 104B or the second touch panel 105B is detected within the predetermined time T after the touch operation is detected, the CPU 110 recognizes and receives the approach operation as the series operation input continued to the previous touch operation.

In contrast, if the approach operation is detected when exceeding the predetermined time T after the touch operation is detected, the CPU 110 recognizes and receives the approach operation as the operation input independent of the previous touch operation.

Accordingly, in the mobile terminal 100, by recognizing and receiving the approach operation as the operation input in addition to the touch operation, it is possible to increase the types of the operation inputs and to perform various operation inputs, compared with the apparatus for performing only the touch operation as the operation input.

In the mobile terminal 100, the approach operation is recognized and received as the operation input in addition to the touch operation. In addition, when the touch operation and the approach operation are continuously performed within the predetermined time T, these operations are recognized as a series of operation inputs.

Therefore, in the mobile terminal 100, it is possible to recognize and receive the touch operation and the approach operation as individual operation inputs and to perform an operation input obtained by combining such operations. As a result, it is possible to perform various operation inputs.

In the mobile terminal 100, the approach operation is recognized and received as the operation input in a state in which the general touch operation (pinch-in, pinch-out, drag, tap, or the like) of the related art is added to such a touch operation without change.

Therefore, the mobile terminal 100 may be easily operated even by a user who is familiar with the general touch operation of the related art. As a result, various operation inputs and easy operation are compatible.

By the above configuration, since the mobile terminal 100 recognizes the touch operation and the approach operation which are continuously performed within the predetermined time T as a series of operation inputs, it is possible to increase the types of the operation inputs, compared with the case where only the touch operation is performed as the operation input. Accordingly, the mobile terminal 100 may perform various operation inputs compared with the related art.

2. Other Embodiment

2-1. Other Embodiment 1

In the above-described embodiment, within the predetermined time T, when the approach shuffle is performed after the contact pinch-in or contact pinch-out or when the approach pinch-out is performed after the contact pinch-out, these operations are received as the series of operation inputs.

The present invention is not limited thereto and a combination of the other various touch operations and approach operations may be received as the series of operation inputs.

Figure 12:
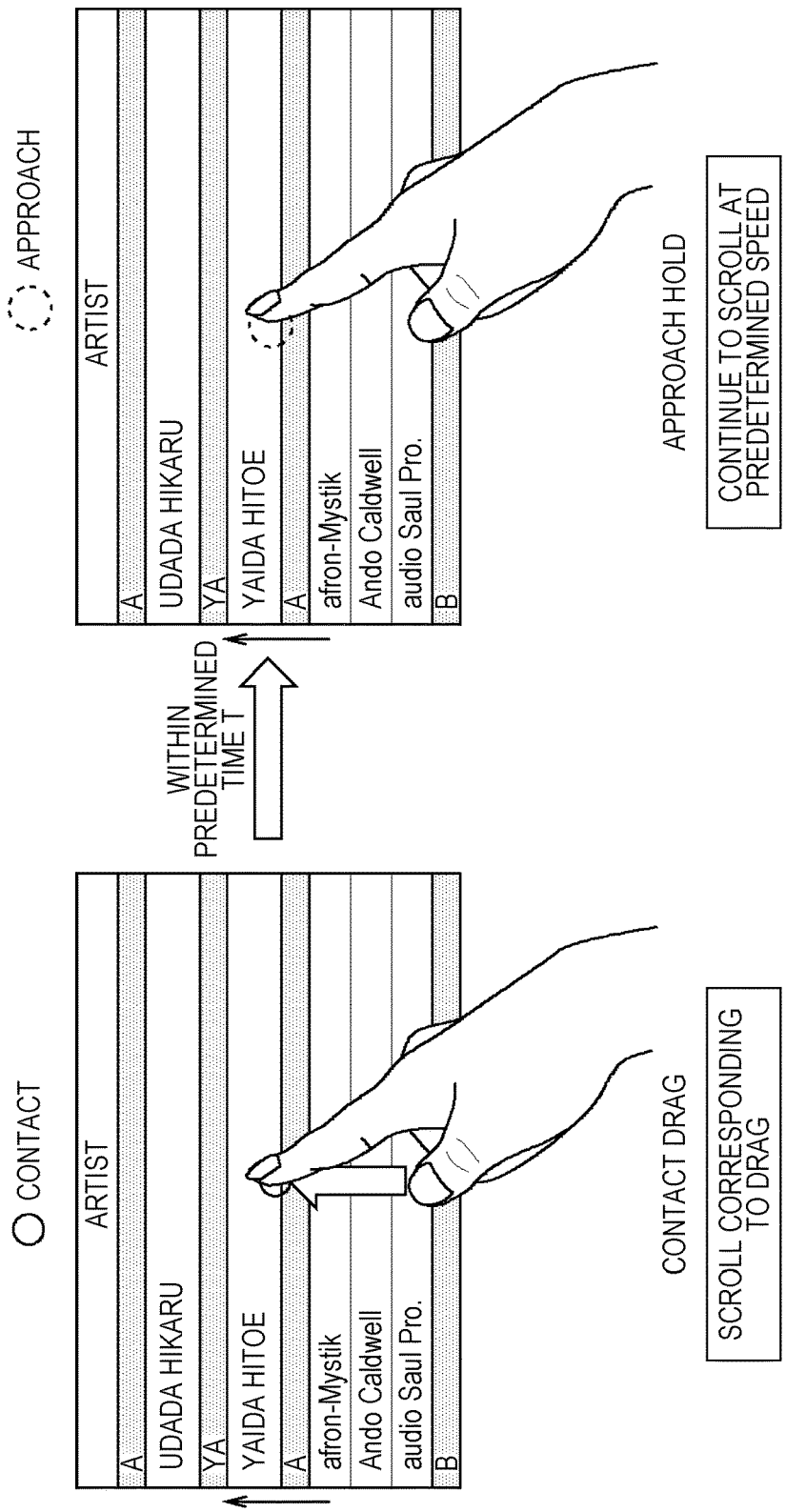
FIG. 12 is a schematic diagrammatic view showing an operation input example (1) according to another embodiment.

For example, as shown in FIG. 12, the case where approach hold is performed after contact drag will be described. Contact drag refers to a touch operation for touching one finger on a touch panel and moving (that is, sliding) the finger in a certain direction. Approach hold is an approach operation for approaching a touch panel with one finger and stopping the finger.

For example, in a state in which a part of a list of artist names acquired from music data is displayed on the first touch screen 104, the user performs the contact drag with respect to the first touch screen 104.

When the contact drag is detected, the CPU 110 recognizes and receives the contact drag as an operation input for scrolling the list and scrolls the list according to the speed, distance and direction of the contact drag.

Thereafter, it is assumed that the user separates the finger from the first touch screen 104 within the predetermined time T and performs the approach hold.

When the approach hold is detected, the CPU 110 recognizes and receives the approach hold as an operation input for continuing to scroll the list by the previous contact drag and continues to scroll the list.

At this time, the CPU 110 continues to scroll the list at the same speed and in the same direction as the scroll of the list by the previous contact drag, during the approach hold.

Accordingly, for example, if the list is scrolled by several screens, the drag is repeatedly performed several times in the related art. However, in the mobile terminal 100, since only one contact drag and approach hold is performed, it is possible to reduce user burden.

When the approach operation for separating and stopping the finger is performed after the touch operation, a process (for example, scrolling) performed by the touch operation may be continuously performed.

2-2. Other Embodiment 2

In the above-described embodiment, when the approach operation is performed within the predetermined time T after the touch operation, these are received as the series of operation inputs. The present invention is not limited thereto. When the touch operation is performed within the predetermined time T after the approach operation, these may be received as the series of operation inputs.

Figure 13:
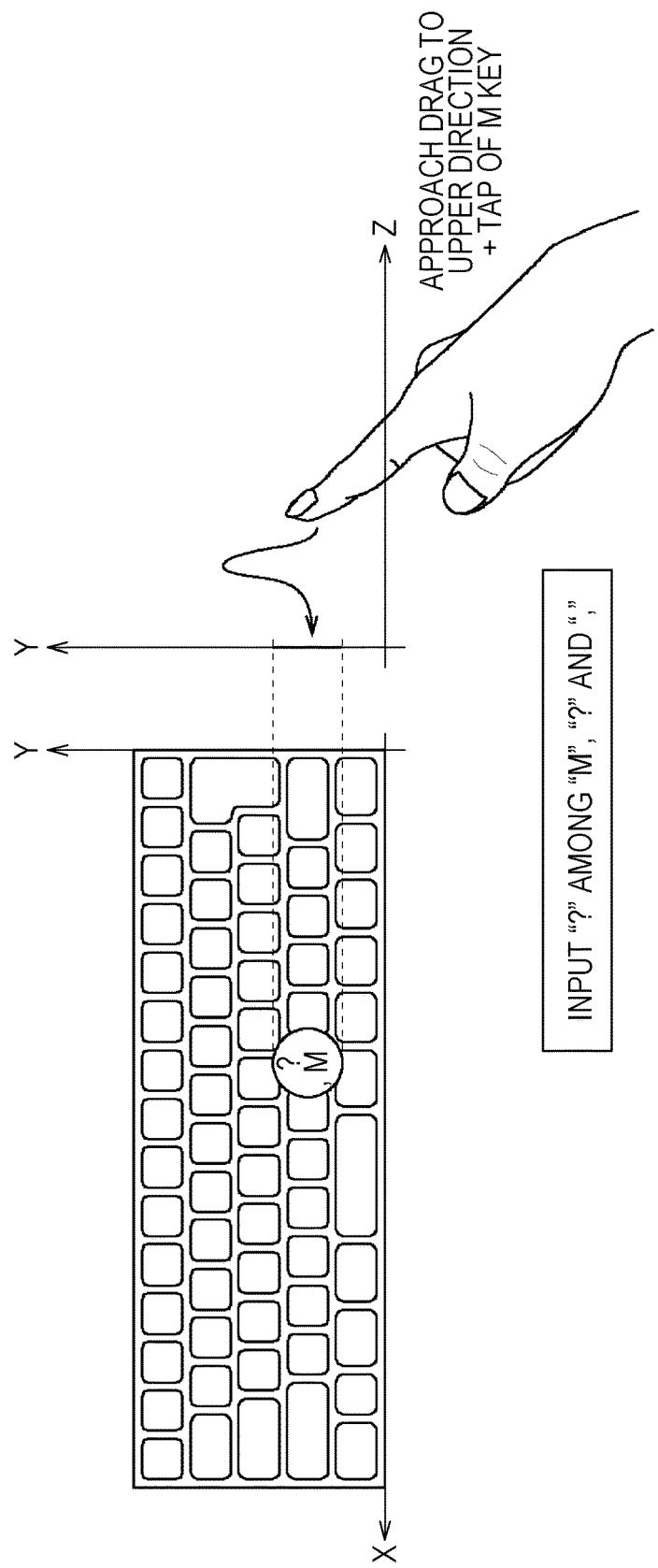
FIG. 13 is a schematic diagrammatic view showing an operation input example (2) according to another embodiment.

For example, as shown in FIG. 13, the case where a tap is performed as the touch operation after approach drag as the approach operation will be described. Approach drag refers to an approach operation for approaching a touch panel with one finger and moving the finger in a certain direction.

It is assumed that a software keyboard is displayed on the first touch screen 104 or the second touch screen 105. In keys configuring the software keyboard, keys for displaying a plurality of inputtable characters are included.

For example, in a key (this is also referred to as an M key) for mainly inputting "M", "M" is displayed in a center thereof, "?" is displayed in an upper end thereof, and "," is displayed at a left end thereof.

At this time, it is assumed that, for example, the user moves their finger by a predetermined amount in an upper direction of the screen (a Y direction of the drawing) on the M key, performs approach drag for returning to an original state, and then taps the M key within the predetermined time T.

When the approach drag and the tap are continuously detected, the CPU 110 recognizes and receives the approach drag and the tap as the series of operation inputs for inputting "?" displayed on the upper end of the M key and issues a command for inputting the character "?". As a result, the character "?" is input to the mobile terminal 100.

In contrast, it is assumed that the user moves the finger by a predetermined amount in a left direction (an X direction of the drawing) of the screen on the M key, performs approach drag for returning to an original state, and taps the M key within the predetermined time T.

When the approach drag and the tap are continuously detected, the CPU 110 recognizes and receives the approach drag and the tap as the series of operation inputs for inputting "," displayed on the left end of the M key and issues a command for inputting the character ",". As a result, the character "," is input to the mobile terminal 100.

It is assumed that the user does not perform the approach drag on the M key and taps the M key.

In this case, when the tap is detected, the CPU 110 recognizes and receives the tap as the operation input for inputting "M" displayed on the center of the M key and issues a command for inputting the character "M". As a result, the character "M" is input to the mobile terminal 100.

In the mobile terminal 100, by performing the approach drag in the upper direction or the left direction just before tapping the M key, it is possible to selectively input the character other than "M" allocated to the M key.

Accordingly, in the mobile terminal 100, it is possible to input a plurality of characters using one key by combination of the direction of the approach drag and the tap. Therefore, it is possible to reduce the number of keys displayed on the screen and, as a result, to efficiently use the screen. In addition, it is possible to realize an intuitively simpler operation, compared with the case where a shift key or the like is touched so as to switch a character inputtable by each key.

The present invention is not limited to such a character input, and the continuous operation of the approach drag and the tap may be the other various operations and may be applied to, for example, a web browser operation.

In practice, for example, an upper half of the web browser screen is displayed on the first touch screen 104 and a lower half of the web browser screen is displayed on the second touch screen 105.

Figure 14:
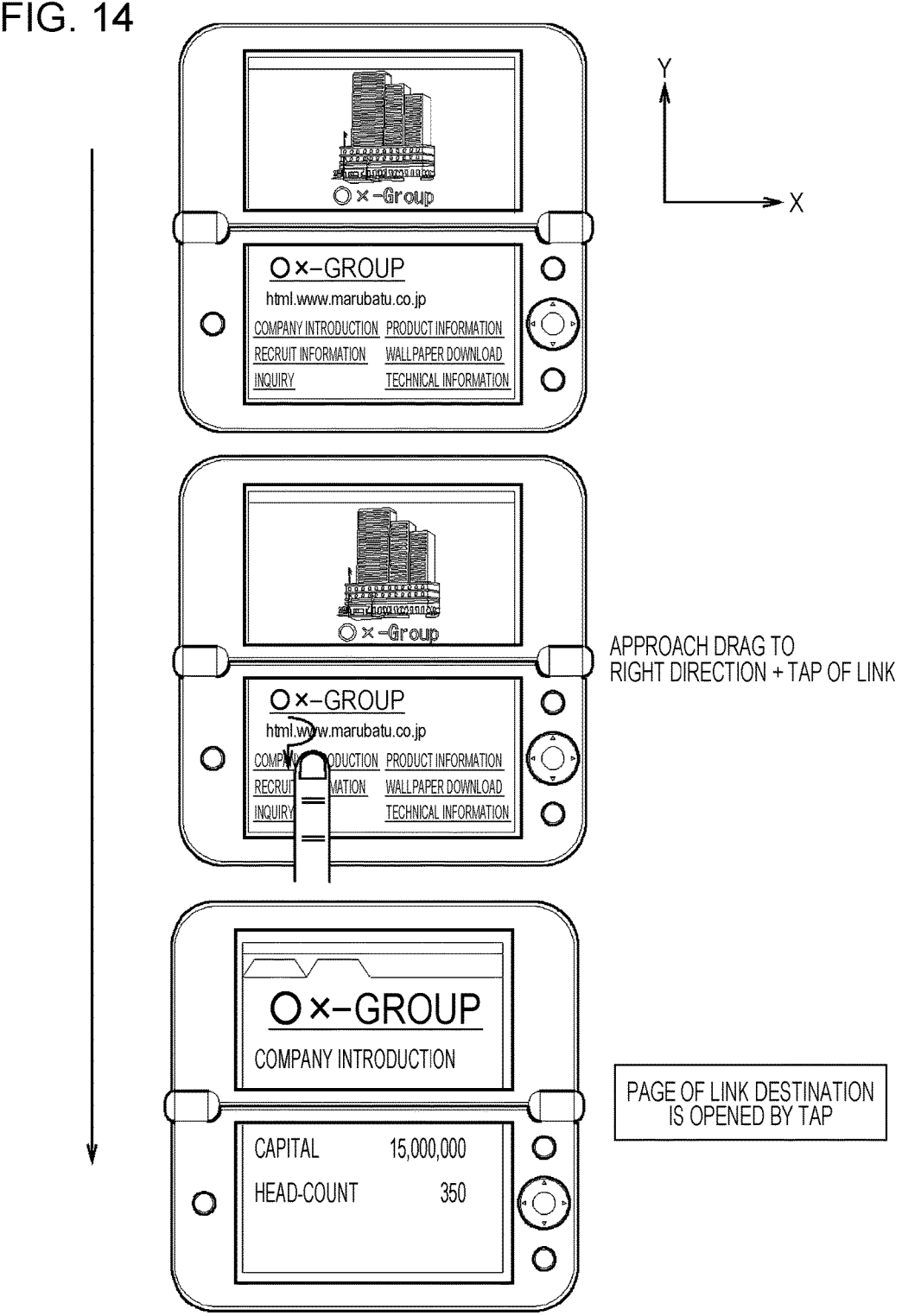
FIG. 14 is a schematic diagrammatic view showing an operation input example (3) according to another embodiment.

At this time, as shown in FIG. 14, it is assumed that the user moves the finger by a predetermined amount in a right direction (an X direction of the drawing) of the screen on a link displayed on the lower half of the web browser screen, performs approach drag for returning to an original state, and taps the link within the predetermined time T.

When the approach drag and the tap are continuously detected, the CPU 110 recognizes and receives the approach drag and the tap as a series of operation inputs for opening a page of a link destination by the tap and issues a command for opening the page of the link destination by the tap. As a result, on the first touch screen 104 and the second touch screen 105, the page image of the page of the link destination is displayed by the tap.

Figure 15:
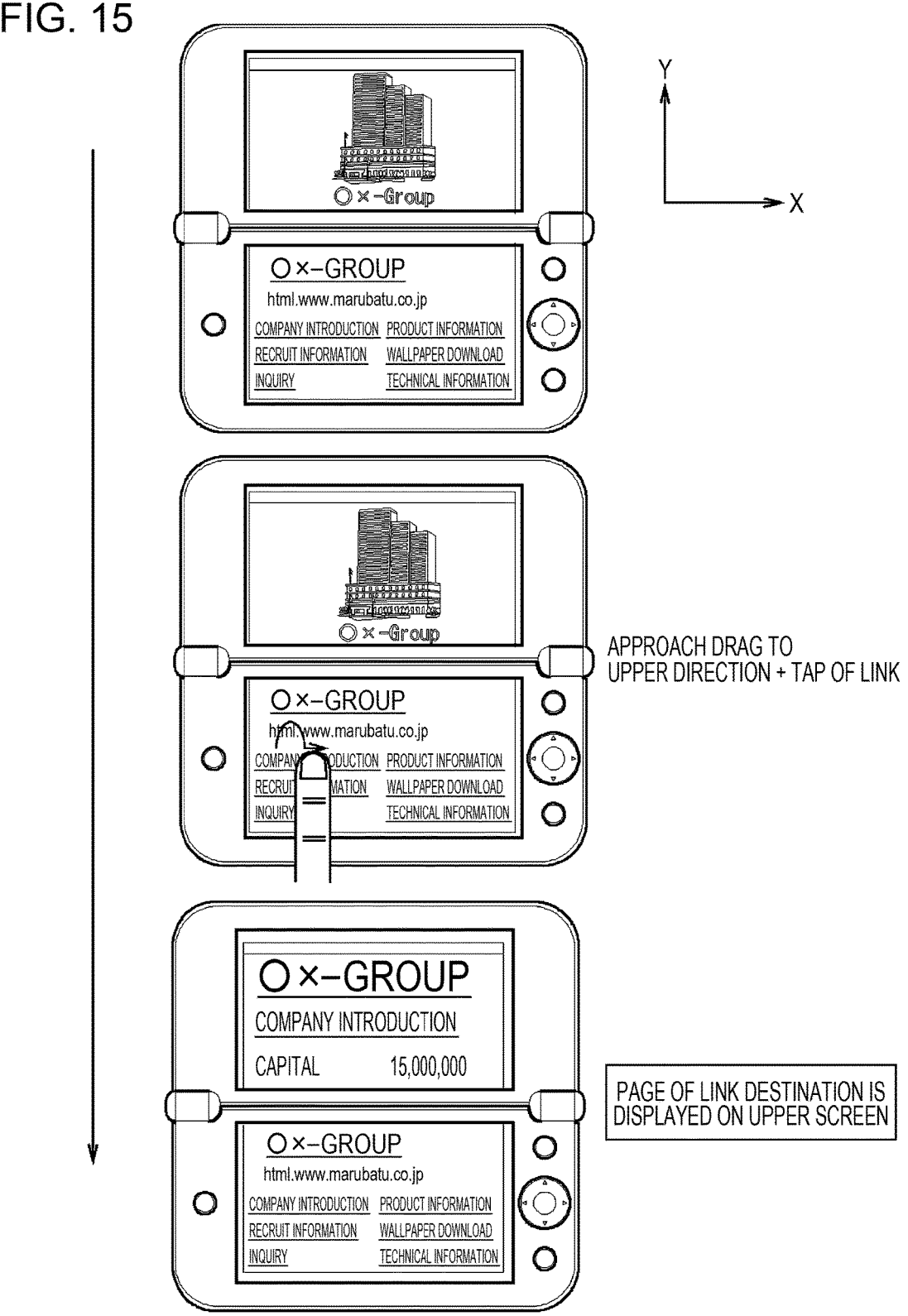
FIG. 15 is a schematic diagrammatic view showing an operation input example (4) according to another embodiment.

In contrast, as shown in FIG. 15, it is assumed that the user moves their finger by a predetermined amount in the upper direction (the Y direction of the drawing) of the screen on the link displayed in the lower half of the web browser screen, performs approach drag for returning to an original state, and taps the link within the predetermined time T.

When the approach drag and the tap are continuously detected, the CPU 110 recognizes and receives the approach drag and the tap as a series of operation inputs for opening a page of a link destination on an upper screen and issues a command for opening the page of the link destination on the upper screen. As a result, the display content of the second touch screen 105 is not changed and the page image of the page of the link destination is displayed only on the first touch screen 104.

In the mobile terminal 100, by performing the approach drag in the upper direction or the right direction just before tapping the link, it is possible to open the page of the link destination using a certain opening method (whether the page is opened on the upper screen or is opened by the tap).

In the mobile terminal 100, a combination of the touch operation and the approach operation received as the series of operation inputs is registered and, when the touch operation and the approach operation are performed by the registered combination, these operations are received as the series of operation inputs.

Such a combination and the operation input corresponding to the combination may be registered by the user. Thus, the user may customize the operation of the mobile terminal 100 so as to facilitate the use of the mobile terminal.

2-3. Other Embodiment 3

In the above-described embodiment, when the approach operation is performed within the predetermined time T after the touch operation for the first touch screen 104 or the second touch screen 105, these operations are received as the series of operation inputs.

The present invention is not limited thereto and, for example, when the approach operation for a touch screen subjected to the touch operation is performed within the predetermined time T after the touch operation, these operations may be received as the series of operation inputs.

In addition, for example, when the approach operation is performed within a predetermined range centered on a touch position subjected to the touch operation after the touch operation, these operations may be recognized and received as the series of operation inputs.

2-4. Other Embodiment 4

In the above-described embodiment, when a touch operation and an approach operation are continuously performed within the predetermined time T without depending on which operation is performed, these operations are received as the series of operation inputs.

The predetermined time T is only exemplary and the point is to receive the operations as the series of operation inputs when a touch operation and an approach operation are continuously performed within the set predetermined time. The present invention is not limited thereto and the predetermined time T may be set with respect to each operation. For example, the predetermined time T may be set to 5 seconds after contact pinch-out and 1 second after contact drag.

The present invention is not limited thereto. For example, the predetermined time T may not be set and, when specific touch operation and approach operation are continuously performed, these operations may be recognized and received as the series of operation inputs.

2-5. Other Embodiment 5

In the above-described embodiment, the present invention is applied to the mobile terminal 100 having the capacitance type first touch panel 104B and second touch panel 105B.

The present invention is not limited thereto. The present invention is applicable to an apparatus including the other various operation input devices, such as an optical sensing touch screen including an optical sensor in a liquid crystal panel, if it is an operation input device capable of detecting the contact and approach of a finger (indicator).

The present invention is applicable to an apparatus including the other various display devices, such as an organic Electro Luminescence (EL) panel, instead of the first liquid crystal panel 104A and the second liquid crystal panel 105A.

2-6. Other Embodiment 6

In the above-described embodiment, the present invention is applied to the mobile terminal 100 having two screens, that is, the first touch screen 104 and the second touch screen 105.

The present invention is not limited thereto and the present invention is applicable to, for example, an apparatus having one screen, that is, one touch screen.

2-7. Other Embodiment 7

In the above-described embodiment, the first touch panel 104B and the second touch panel 105B functioning as the contact detection unit 2 and the approach detection unit 3 are provided in the mobile terminal 100 as the information processing device 1. The CPU 110 is provided as the control unit 4 of the information processing device 1.

The present invention is not limited thereto. If the same function is performed, each unit of the above-described mobile terminal 100 may be configured by a variety of other hardware or software.

The present invention is not limited to the mobile terminal 100 and is applicable to various apparatuses such as a digital still camera, a stationary personal computer, a games machine, a mobile audio player or a mobile telephone.

2-8. Other Embodiment 8

In the above-described embodiment, a program for executing a variety of processes is written in the non-volatile memory 111 of the mobile terminal 100.

The present invention is not limited thereto. For example, a slot of a storage medium such as a memory card may be provided in the mobile terminal 100 and the CPU 110 may read and execute a program from the storage medium inserted into the slot. In addition, the CPU 110 may install the program read from the storage medium in the non-volatile memory 111. In addition, the CPU 110 may download the program from an apparatus on a network through a network I/F 114 and install the program in the non-volatile memory 111.

2-9. Other Embodiment 9

In addition, the present invention is not limited to the above-described embodiment and the other embodiments. That is, the present invention is applicable to an arbitrary combination of a part or all of the above-described embodiment and the other embodiments or a part extracted from the above-described embodiment and the other embodiments.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
a display;
a touch panel; and
circuitry configured to control:
displaying a plurality of items on the display,
detecting a touch scroll operation in which an operating object moves at least partially in a first direction while in contact with the touch panel, and a proximity scroll operation in which the operating object hovers at a predetermined position over the touch panel,
a scroll speed in which (a) the scroll speed is controlled as a contact drag scroll speed corresponding to a move speed of the operating object in a case that the touch scroll operation is detected and (b) the scroll speed is controlled as a proximity scroll speed which is a predetermined scroll speed in a case that the proximity scroll operation is detected, and
scrolling the plurality of items in the first direction in accordance with the scroll speed.

2. The information processing apparatus of claim 1, wherein the operating object includes a finger or a touch pen.

3. The information processing apparatus of claim 1, wherein the predetermined scroll speed is a constant speed.

4. The information processing apparatus of claim 1, wherein the predetermined scroll speed is the contact drag scroll speed.

5. The information processing apparatus of claim 1, wherein the proximity scroll operation is detected when the operating object hovering over at least part of the plurality of items in proximity to the touch panel is detected within a predetermined time after the touch scroll operation is performed.

6. The information processing apparatus of claim 1, wherein the predetermined scroll speed is same as a speed at which the plurality of items is scrolled in response to the detected touch scroll operation.

7. The information processing apparatus of claim 1, wherein the plurality of items is displayed on the display when the detected touch scroll operation is detected.

8. The information processing apparatus of claim 1, wherein the detected proximity scroll operation is detected based on a determination that the operating object is less than a first predetermined distance and greater than a second predetermined distance from the touch panel.

9. The information processing apparatus of claim 1, wherein the detected proximity scroll operation is detected after the operating object moving at least partially in the first direction while in contact with the touch panel has stopped.

10. The information processing apparatus of claim 1, wherein the plurality of items is scrolled in the first direction in response to the detected touch scroll operation while the operating object moves at least partially in the first direction while in contact with the touch panel.

11. An information processing method comprising:
displaying a plurality of items on a display;
detecting a touch scroll operation in which an operating object moves at least partially in a first direction while in contact with a touch panel, and a proximity scroll operation in which the operating object hovers at a predetermined position over the touch panel;
controlling a scroll speed in which (a) the scroll speed is controlled as a contact drag scroll speed corresponding to a move speed of the operating object in a case that the touch scroll operation is detected and (b) the scroll speed is controlled as a proximity scroll speed which is a predetermined scroll speed in a case that the proximity scroll operation is detected; and
scrolling the plurality of items in the first direction in accordance with the scroll speed.

12. The information processing method of claim 11, wherein the operating object includes a finger or a touch pen.

13. The information processing method of claim 11, wherein the predetermined scroll speed is a constant speed.

14. The information processing method of claim 11, wherein the predetermined scroll speed is the contact drag scroll speed.

15. The information processing method of claim 11, wherein the proximity scroll operation is detected when the operating object hovering over at least part of the plurality of items in proximity to the touch panel is detected within a predetermined time after the touch scroll operation is performed.

16. The information processing method of claim 11, wherein the predetermined scroll speed is same as a speed at which the plurality of items is scrolled in response to the detected touch scroll operation.

17. The information processing method of claim 11, wherein the plurality of items is displayed on the display when the detected touch scroll operation is detected.

18. The information processing method of claim 11, wherein the detected proximity scroll operation is detected based on a determination that the operating object is less than a first predetermined distance and greater than a second predetermined distance from the touch panel.

19. The information processing method of claim 11, wherein the detected proximity scroll operation is detected after the operating object moving at least partially in the first direction while in contact with the touch panel has stopped.

20. A non-transitory computer readable storage medium configured to store a program, the program comprising:
   displaying a plurality of items on a display;
   detecting a touch scroll operation in which an operating object moves at least partially in a first direction while in contact with a touch panel, and a proximity scroll operation in which the operating object hovers at a predetermined position over the touch panel;
   controlling a scroll speed in which (a) the scroll speed is controlled as a contact drag scroll speed corresponding to a move speed of the operating object in a case that the touch scroll operation is detected and (b) the scroll speed is controlled as a proximity scroll speed which is a predetermined scroll speed in a case that the proximity scroll operation is detected; and
   scrolling the plurality of items in the first direction in accordance with the scroll speed.

* * * * *